(12) United States Patent
Li et al.

(10) Patent No.: US 9,710,742 B2
(45) Date of Patent: Jul. 18, 2017

(54) COPY AND PASTE WITH SCANNABLE CODE

(71) Applicant: MICROSOFT TECHNOLOGY LICENSING, LLC, Redmond, WA (US)

(72) Inventors: Wujun Li, Sammamish, WA (US); Hongrui Zhang, Redmond, WA (US); Yi Zhang, Bothell, WA (US); Sangeeta Mudnal, Medina, WA (US); Fei Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/957,555

(22) Filed: Dec. 2, 2015

(65) Prior Publication Data
US 2017/0161599 A1 Jun. 8, 2017

(51) Int. Cl.
G06K 19/00 (2006.01)
G06K 19/06 (2006.01)

(52) U.S. Cl.
CPC .............................. G06K 19/06037 (2013.01)

(58) Field of Classification Search
CPC .... G06K 19/06037; G06K 7/14; B42D 15/10; G07F 7/1008
USPC .................................................. 235/494, 487
See application file for complete search history.

(56) References Cited

U.S. PATENT DOCUMENTS

| 8,418,920 | B2 | 4/2013 | Lieberman et al. |
| 8,616,439 | B1 | 12/2013 | Azen et al. |
| 9,286,560 | B2 * | 3/2016 | Burkhart .......... G06K 19/06037 |
| 2011/0038552 | A1 | 2/2011 | Lam |
| 2012/0187185 | A1 | 7/2012 | Sayan |
| 2014/0061293 | A1 * | 3/2014 | Jayaprakash ..... G06F 17/30879 235/375 |
| 2014/0108606 | A1 | 4/2014 | Beadles |
| 2014/0244456 | A1 | 8/2014 | Huang et al. |
| 2014/0331335 | A1 | 11/2014 | Deschenes et al. |
| 2015/0082410 | A1 | 3/2015 | Fitzgerald et al. |
| 2016/0063129 | A1 * | 3/2016 | Lim ...................... G06Q 30/02 455/456.3 |

FOREIGN PATENT DOCUMENTS

KR 20120064213 A 6/2012

OTHER PUBLICATIONS

Geel, et al., "PresiShare: Opportunistic Sharing and Presentation of Content using Public Displays and QR Codes", In Proceedings of 2nd ACM International Symposium on Pervasive Displays, Jun. 4, 2013, pp. 103-108.

Basu, Saikat, "How to Share Any Word, PPT, PDF Documents or Image Files Using QR Codes", Published on: Jan. 12, 2012 Available at: http://www.guidingtech.com/9070/share-word-ppt-pdf-documents-image-files-using-qr-codes/.

(Continued)

*Primary Examiner* — Karl D Frech
(74) *Attorney, Agent, or Firm* — Workman Nydegger (57) ABSTRACT

A scannable code is used to facilitate copy and paste of content, wherein the content is serialized and encoded directly into the scannable code along with context information. When the scannable code is decoded, the content is pasted into a desired location in a manner that is consistent with the content information.

20 Claims, 9 Drawing Sheets

(56) References Cited

OTHER PUBLICATIONS

Zaman, Qamar, "Integrating QR Codes to SharePoint Document Libraries", Published on: Mar. 8, 2013 Available at: http://sharepoint-community.net/profiles/blogs/integrating-qr-codes-to-sharepoint-document-libraries.
"SuperBeam—Quick and Easy File Sharing", Published on: Apr. 6, 2014 Available at: http://superbe.am/.
Protalinski, Emil, "Watch this: Google Docs can automatically generate QR Codes", Published on: Oct. 2, 2013 Available at: http://thenextweb.com/shareables/2013/10/02/watch-this-google-docs-can-automatically-generate-qr-codes/.
Lam, Billy, "Send! | File Transfer", Retrieved on: Sep. 15, 2015 Available at: https://play.google.com/store/apps/details?id=nz.intelx.send.lite&hl=en.
International Search Report and Written Opinion issued in PCT/US2016/062634, mailed Jan. 31, 2017.
Anonymous "The Bat! and QR Code—How Does it Work?", Oct. 6, 2015.
Anonymous "How to Create QR Codes from Right-Click Menu in Chrome", dotTech, Oct. 31, 2014.
Anonymous "How Much Data Can a QR Code Hold?—Quora" Apr. 17, 2013.
Anonymous "FAQ: QRcode.com—Denso Wave" Nov. 8, 2015.
Anonymous "Office Excel Barcode Encoding Add-In Integration Tutorial and Barcode Creation in Excel Guide", Nov. 21, 2015.

\* cited by examiner

Paragraph one text, paragraph one text, paragraph one text, paragraph one text, paragraph one text, paragraph one text, paragraph one text, paragraph one text, paragraph one text, paragraph one text, paragraph one text, SENSITIVE INFORMATION, SENSITIVE INFORMATION, paragraph one text, paragraph one text, paragraph one text, paragraph one text, paragraph one text, paragraph one text, paragraph one text, paragraph one text, paragraph one text, paragraph one text, paragraph one text, paragraph one text, paragraph one text. ~ 610A Paragraph two text, paragraph two text, paragraph two text, paragraph two text, paragraph two text, paragraph two text, paragraph two text, paragraph two text, paragraph two text, paragraph two text, paragraph two text, paragraph two text, paragraph two text, paragraph two text, paragraph two text, paragraph two text, paragraph two text.

Paragraph three is all sensitive, paragraph three is all sensitive.

Paragraph one text, paragraph one text, paragraph one text, paragraph one text, paragraph one text, paragraph one text, paragraph one text, paragraph one text, paragraph one text, paragraph one text, paragraph one text,  , paragraph one text, paragraph one text, paragraph one text, paragraph one text, paragraph one text, paragraph one text, paragraph one text, paragraph one text, paragraph one text, paragraph one text, paragraph one text, paragraph one text, paragraph one text, paragraph one text. ~ 610B

Paragraph two text, paragraph two text, paragraph two text, paragraph two text, paragraph two text, paragraph two text, paragraph two text, paragraph two text, paragraph two text, paragraph two text, paragraph two text, paragraph two text, paragraph two text, paragraph two text, paragraph two text, paragraph two text, paragraph two text.

COPY AND PASTE WITH SCANNABLE CODE

BACKGROUND

Computers and computing systems affect nearly every aspect of modern living. For instance, computers are generally involved in work, recreation, healthcare, transportation, entertainment, household management, etc.

Computer system functionality is often enhanced by interconnecting computing systems via network connections. These network connections allow a computer system to access services and data from remote computing systems and to quickly and efficiently transmit data between those systems.

Computer configurations include various form factors, including desktops, laptops, tablets, phablets, mobile phones, PDAs, etc. Computers are also configured with hardware and software interfaces to facilitate direct user interaction. For example, a computer may include a keyboard, mouse, touchpad, camera, gyroscope, and other hardware for receiving input, while, displays, speakers, haptic feedback devices and other hardware are used to render output.

Software interfaces, including graphical user interfaces, are used to both receive input and to render output. Some encoding software interfaces are operable to generate scannable codes that contain encoded link. For instance a QR code (Quick Reference code) can be encoded with a URL or other link. Corresponding optical sensors and decoding interfaces are operable to scan the codes, decode the links, and thereby access corresponding data maintained at specific remote locations or more generally within the 'cloud.'

The 'cloud,' includes a shared pool of configurable computing resources (e.g., networks, servers, storage, applications, services, etc.) that can be provisioned and released on demand. The cloud may be configured with various service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of this disclosure include systems, methods and storage devices for facilitating use of scannable codes to share content between devices and, in some embodiments, for facilitating copy and paste functionality with scannable codes.

In some embodiments, a data source computing system is configured for facilitating copy and paste functionality by utilizing a scannable code that includes copied data that is encoded along with context information corresponding to the format and application context of the data that is being copied and encoded directly into the scannable code.

In some embodiments, a destination computing system is configured to decode the content and corresponding context information from the scannable code and to paste the copied content with the same corresponding context into an application instance on the destination device.

Some embodiments are provided for facilitating direct peer to peer transfer of data with scannable codes without utilizing the Internet, the cloud, other intermediary computing devices and/or other network channels to transmit the data.

Yet other embodiments are provided for facilitating redaction, encryption compression and/or replacement of content with scannable codes and decoding of scannable codes to access the redacted, encrypted, compressed and/or replaced content.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

As indicated above, embodiments of this disclosure include systems, methods and storage devices for facilitating use of scannable codes and, in some embodiments, for facilitating copy and paste functionality with scannable codes.

For instance, in one implementation, a data source computing system copies a selection of data from a source application instance and encodes that data into a scannable code that also includes encoded context information corresponding to the format and application context of the data that is being copied.

In a related instance, a destination computing system scans and decodes the copied data and corresponding context information from the scannable code and thereafter pastes the copied content into an application instance at the destination device, with the same corresponding context that existed at the source application instance.

In some instances, two devices perform a direct peer to peer transfer of data, using scannable codes, without utilizing the Internet, the cloud, intermediary computing devices and/or other network channels.

In yet other instances, data is selectively redacted, encrypted, compressed and/or replaced within a document by one or more scannable codes. These scannable codes are selectively decoded at a later time to access the redacted, encrypted, compressed and/or replaced content. Then, in some instances, the scannable codes are subsequently replaced by the accessed content within the documents.

Figure 4:
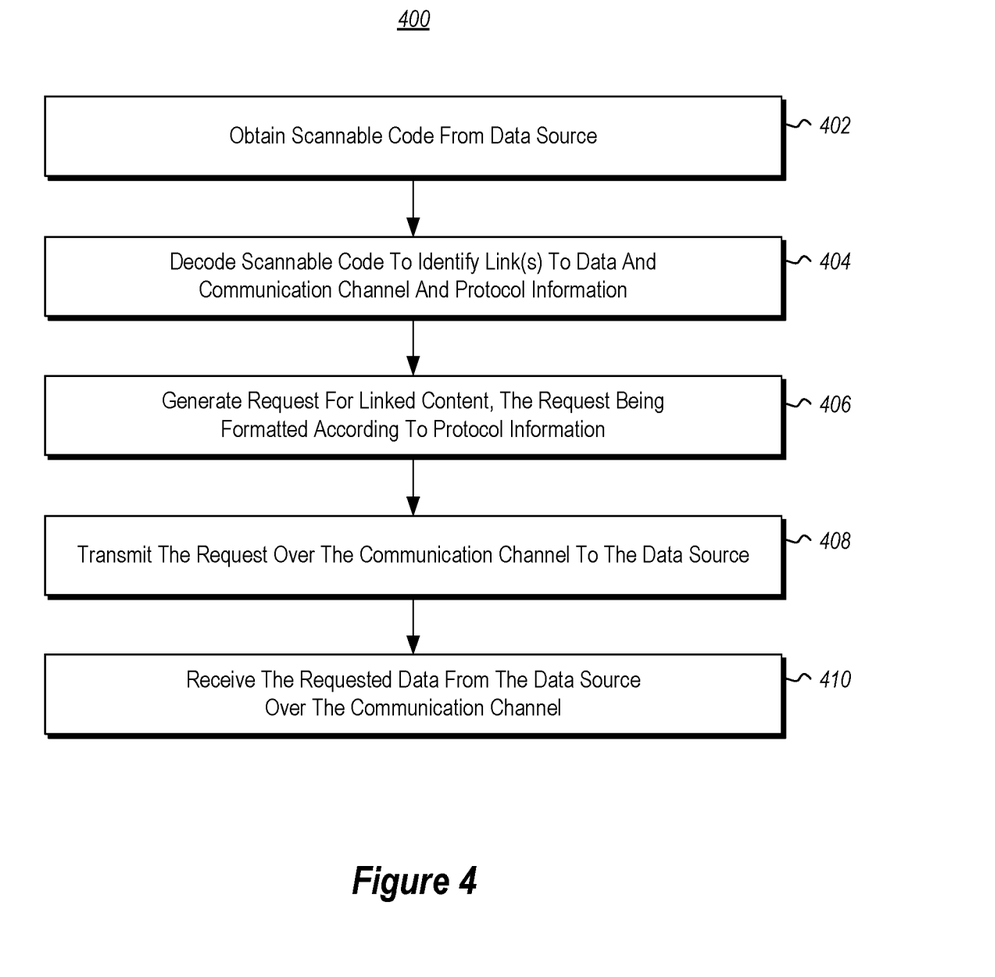
FIG. 4 illustrates a flowchart with various acts that can be implemented by a destination computing system for facilitating peer to peer transmission of content utilizing scannable codes, without utilizing intermediary computing device(s)
Figure 5:
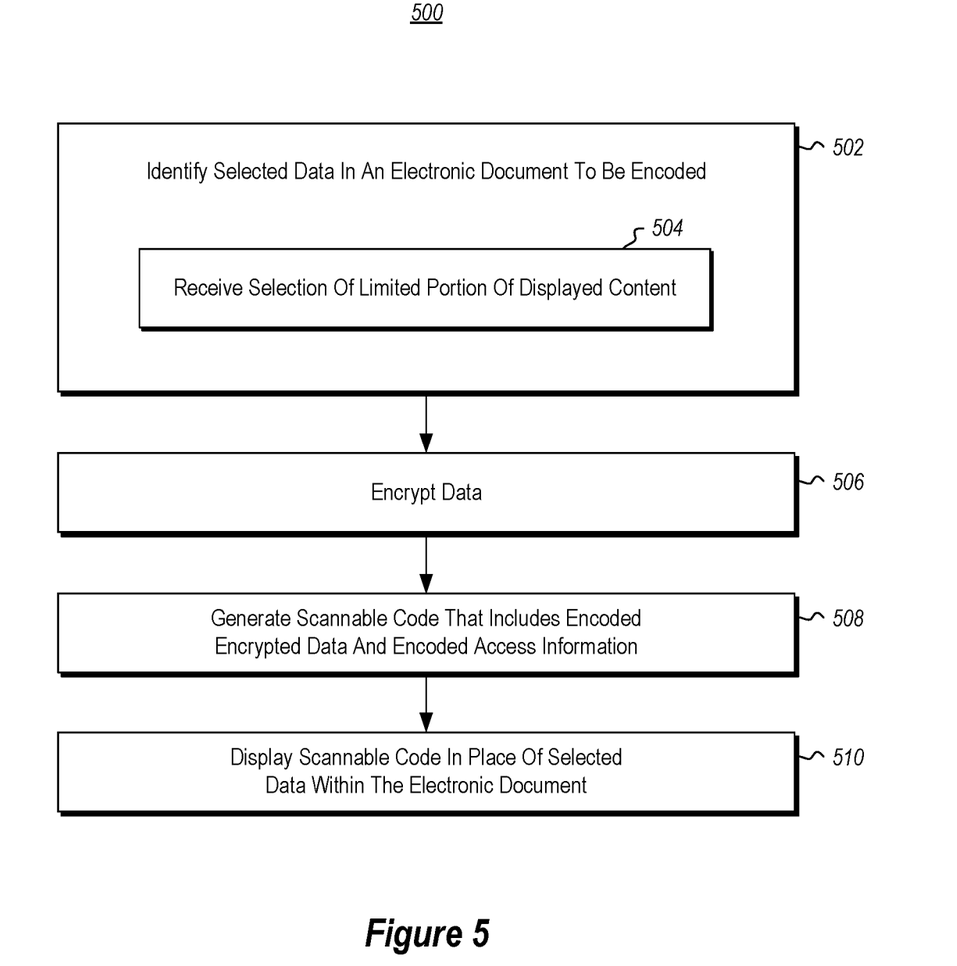
FIG. 5 illustrates a flowchart with various acts that can be implemented by a computing system for facilitating the use of a scannable code to encrypt, redact and/or replace content with the scannable code.
Figure 6A:
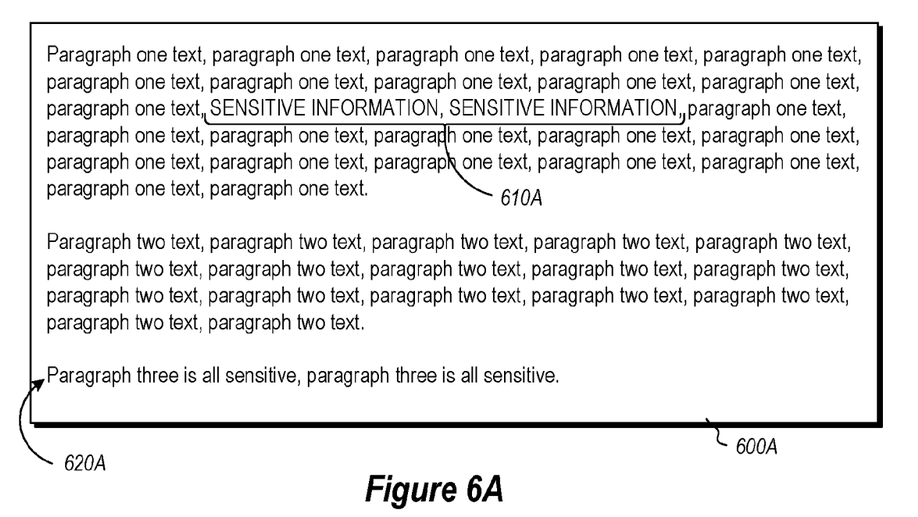
FIGS. 6A-6B illustrate examples of content that includes sensitive information (in FIG. 6A) that is replaced by scannable codes (in FIG. 6B)
Figure 6B:
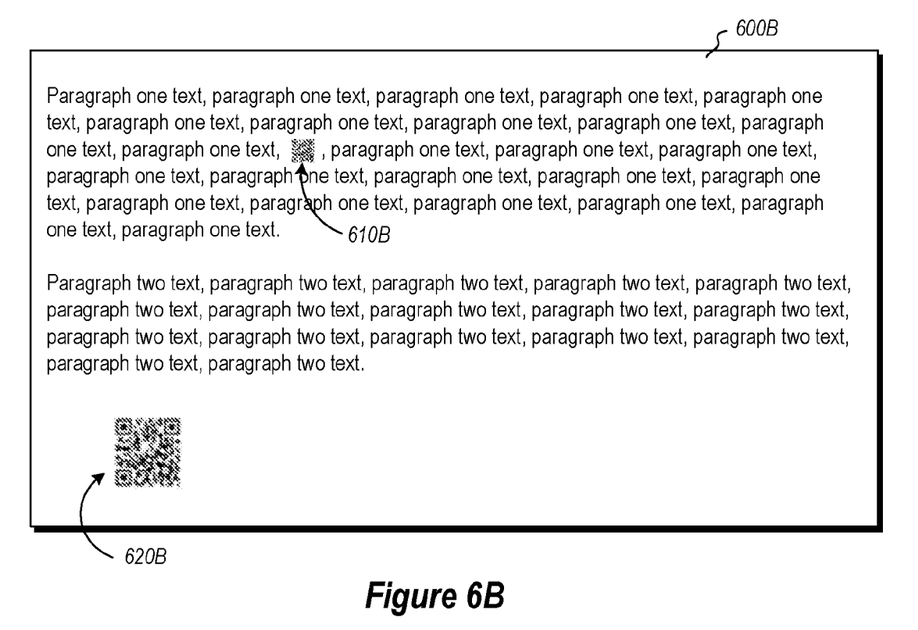

Reference will now be made to various flowcharts and illustrations that describe and illustrate different aspects of the disclosed embodiments for utilizing scannable codes, such as the implementing of copy and paste functionality with scannable codes (FIGS. 1-2 and 7-9), peer to peer transfer of content with scannable codes (FIGS. 3-4 and 8), and the encrypting, redacting and/or replacing content with scannable codes (FIGS. 5, 6A and 6B).

Figure 1:
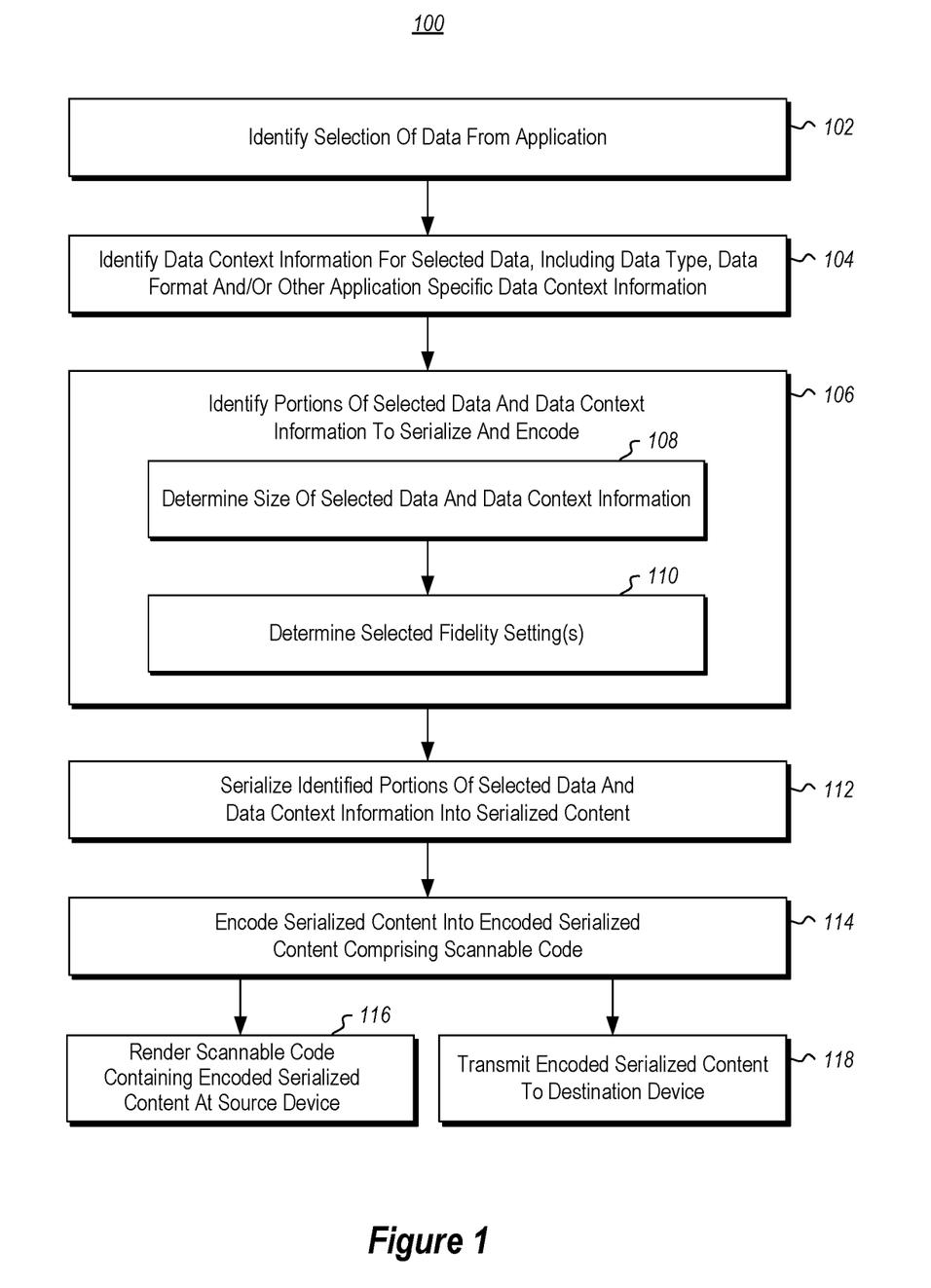
FIG. 1 illustrates a flowchart with various acts that can be implemented by a source computing system for facilitating copy and paste functionality with scannable codes.

One method for implementing copy and paste functionality with scannable codes is reflected by the flowchart 100 of FIG. 1. This flowchart 100 includes a plurality of acts that are performed by the computing system that contains the data content to be copied. This computing system is referred to herein as a data source computing system. An example of a data source computing system includes the mobile device 700 of FIGS. 7-9.

Figure 7:
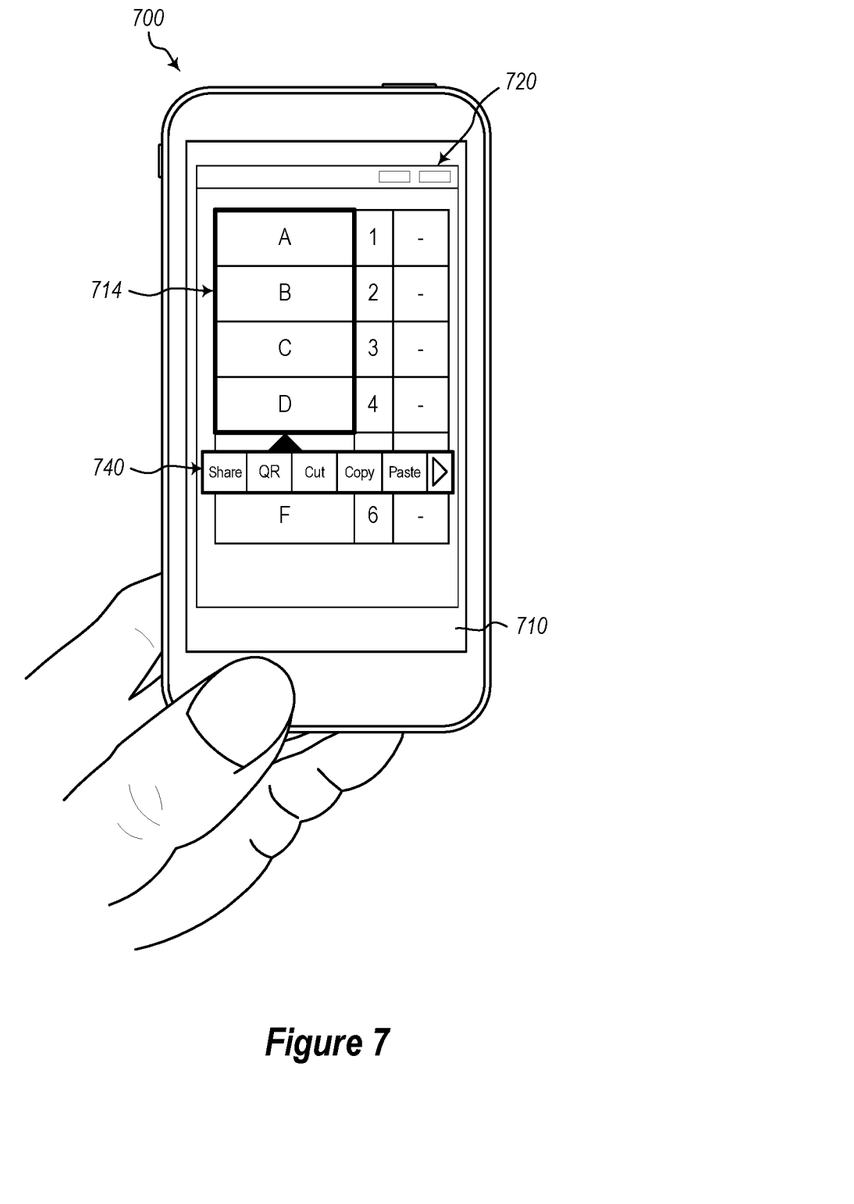
FIG. 7 illustrates a source device which is displaying an interface of an application with selected content and an interactive copying tool that includes a selectable object which, when selected, causes the selected content to be encoded into a scannable code with corresponding context information.

This data source computing system includes at least one hardware processor 702 configured to execute computer-executable instructions, a display screen 710 and one or more hardware storage device 712 having stored computer-executable instructions that are executable by the at least one hardware processor 702 to cause the data source computing system to implement at least the acts shown in flowchart 100.

For instance, the data source computing system or mobile device 700 executes stored instructions to identify selected data (act 102), which can be any data selected from an application. An example of selected data includes the data presented in the selected section 714 of the source application interface 720, which is presently displayed on the display screen 710 of mobile device 700.

It will be appreciated that the selected data can include any data type and is not limited to character or text data. For instance, the selected data can also include image data (e.g., charts, diagrams, photographs, drawings, display objects, etc.) and combinations of character and image data. In some instances, the selected data or content is associated with a particular set of data contextual information that is also identified for inclusion with the selected data into a scannable code (act 104).

This data context information includes any combination of application specific context information and content format specific context information. For instance, the data context information includes any combination of one or more application type, application version, data type, positioning information corresponding to a relative positioning of the selected data in the source application, display attributes (e.g., transparency, font type, shading, coloring, highlighting and/or other display attribute(s)), author information, formula information, and/or edit versioning information corresponding to the selected data and/or source application. Device properties of the source device and/or user credentials and authorization information is also be included within the data context information in some instances.

In the embodiment of FIG. 7, the selected section 714 of content/data from the application interface 720 includes part of a column of a spreadsheet, including four separate cells that contain data abstractly represented as 'A,' 'B,' 'C' and 'D.' It will be appreciated, however, that this data (A, B, C and D) can actually represent other forms of data content, including any combination of text, numbers, formulas, images and/or other types of data, as suggested above. Some other examples of different data types that can be represented include (e.g., strings, integers, characters, different types of currency, different language type(s), dates, times, symbols, etc.), which may or may not be unique or include a specific format corresponding to a particular application.

The identification of the data context information may include parsing data fields and examining metadata associated with the selected data or containers that contain the data (e.g., column, row, field, and other containers) to identify data types and formats of the data, as well as any combination of corresponding container information, application information, device information, user information, or use restriction information.

As indicated above, the identification of the data context information may also include identifying a position of selected data relative to other application interface components. The identification of the data context information can also include identifying executables and formulas that apply to the selected data, as well as other data that is referenced by the selected data, but which was not explicitly included with a graphical boundary selected by the user. All of this related information can be included in the data context information that is identified (act 104).

After identifying the selected content (act 102) and the corresponding data context information (act 104), the data source computing system identifies the portion(s) of the selected content and data context information that is to be serialized and encoded into a scannable code (act 106).

In some embodiments, this accomplished by first identifying a type of code to be utilized and the storage constraints for that code, as well as the estimated size of the selected content and data context information (act 108) that is to be encoded therein. For instance, there are different types of scannable codes, including, but not limited to barcodes, QR codes (Model1, Model2, MicroCode, iQR, SQRC, Frame QR, etc.), and other codes, which can be monochromatic or color spectrum codes, and all of which have different storage capacities and constraints corresponding to different types of data that can be represented within the codes (e.g., numeric, alphanumeric, Kanji, etc.)

If the total amount of content and data context information (once serialized/encoded) will exceed the acceptable storage constraints of the selected QR code or other selected scannable code that is to be used, then only a limited set or portion of the selected content and/or data context information will ultimately be identified for actual serializing/encoding into the scannable code. Accordingly, in some instances, the data source computing system will refrain from serializing and encoding all of the selected data because there is not room for it all.

The limited set or portion of data that is selected for serializing/encoding will, in some embodiments, include at least some or all of the context information that is sufficient to determine location, size and/or relative placement parameters for the data from the source application instance, so that the receiving device can allocate sufficient display/storage resources for the content to be pasted into a corresponding application instance.

Any content that is not selected for serialization/encoding can be stored at one or more location on the source device or another location remote to the source device. One or more link(s) for any such the storage location(s) are also included in the additional data context information that will be serialized/encoded into the scannable code along with the identified/selection portion(s) of the content and context information.

For instances in which a determination is made that there is not sufficient capacity within the scannable code for all of the selected data and context information, the source device, user and/or the destination device may indicate that fidelity of the selected data and/or context information can be changed/reduced to reduce the requirements for storing the selected data and context information (act 110).

By way of example, if the requirements for storing serialized/encoded content is 2 MB and exceeds the capacity of a predetermined scannable code (e.g., 1.5 MB), the fidelity of the content can be reduced by compressing image data, resizing image data, truncating numerical data, truncating strings, eliminating font definitions and other formatting definitions, performing other compression processes, etc.) until the requirements for storing the resized serialized/encoded content is less than or equal to 1.5 MB.

The process of reducing the fidelity (act 110), by eliminating content, resizing content and/or compressing content can be performed sequentially and iteratively until storage requirements fit within the determined constraints of the scannable code, based on any policy and a prioritization hierarchy (e.g., a policy to resize content prior to eliminating font definitions, a policy to truncate insignificant digits prior to compressing data, a policy to change resolution of an image prior to cropping the image, etc.).

In some embodiments, in which a determination is made that there is not sufficient capacity within the scannable code for all of the selected data and context information, the source device will dynamically select a different type of scannable code to be used that has greater storage capacity (e.g., selecting a iQR code with a 40,000 character capacity compared to a Model1 QR code with a 1,167 character capacity).

The selection of different scannable code(s) and fidelity settings can be made automatically based on any combination of application, device or user settings and dynamically detected conditions. The trigger for selecting and/or switching scannable codes or fidelity settings can also be based on user input that is provided in direct in response to prompts provided to the user in response to detecting the conditions that warrant selecting a different scannable code or fidelity setting.

The identified portion(s) of the selected data and the data context information is then serialized (act 112) (e.g., with XML or any other serialization) and encoded (act 112) into the format of the predetermined/selected scannable code. This serialized data may include one or more links when the identified portion(s) of the selected data is only a subset of selected data, as indicated above. Alternatively, when all the selected data fits within the scannable code then the serialized content may omit any links.

This scannable code is then rendered at the data source computing device (act 116) to be scanned by the destination device or it is otherwise transmitted to the destination device (act 118), such as through an electronic mail, message or other transmission.

Figure 8:
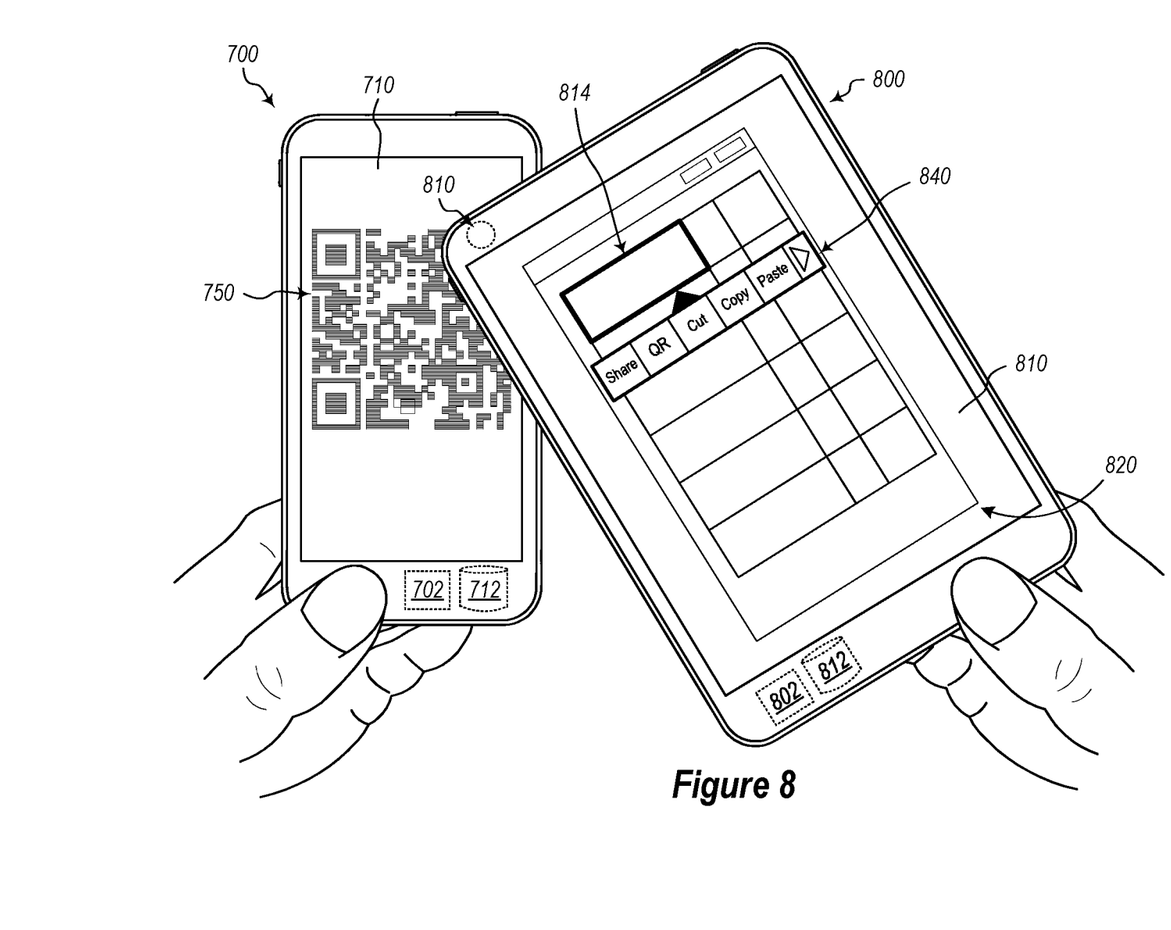
FIG. 8 illustrates a source device and a destination device, wherein the source device is displaying a scannable code that is encoded with copied content and corresponding context information, and a destination device is displaying a selected location of an interface with an interactive pasting tool that includes a selectable object which, when selected, causes the scanning and decoding of the scannable code and pasting of the corresponding content into the selected location with formatting based on the context information.
Figure 9:
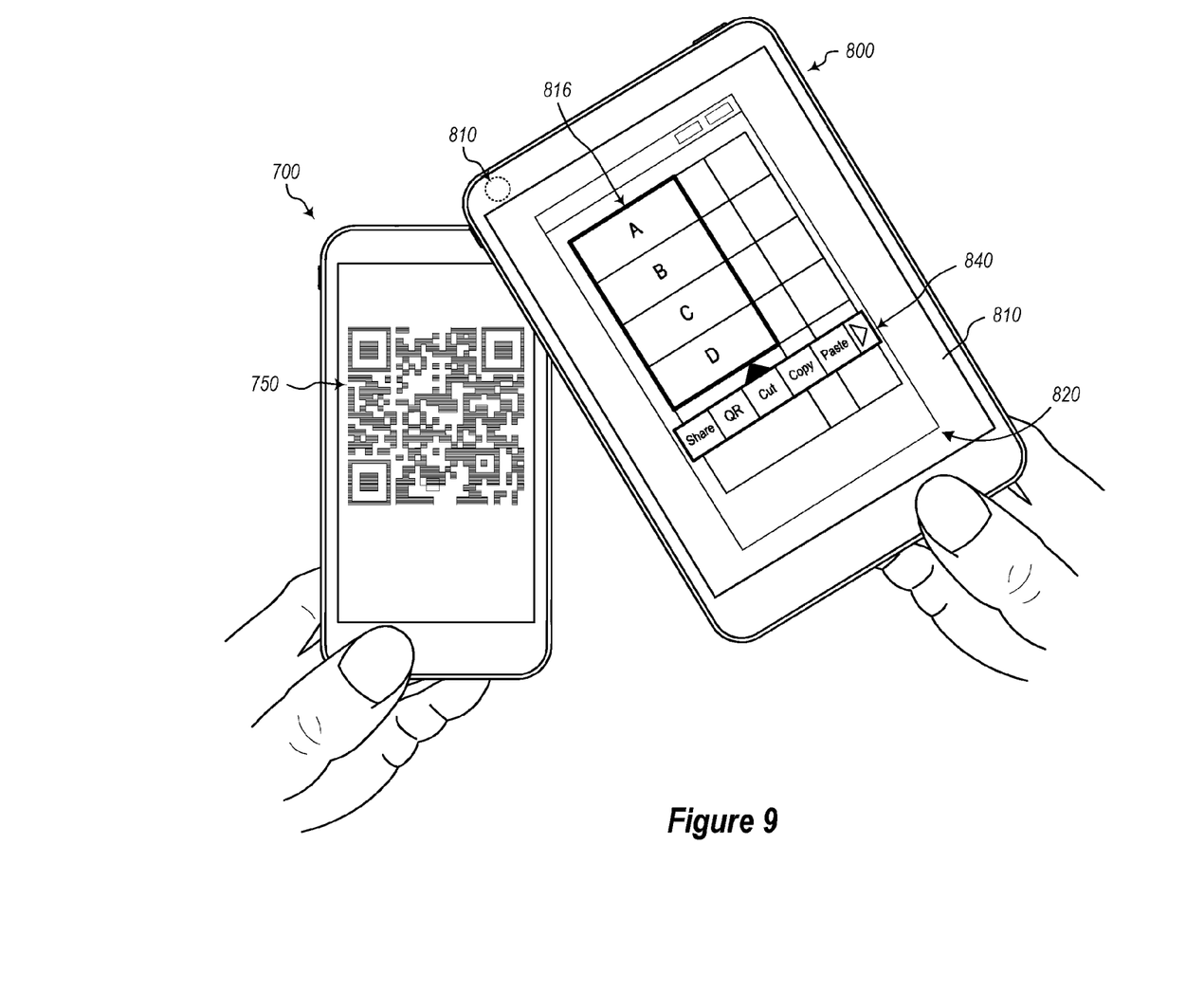
FIG. 9 illustrates the destination device of FIG. 8 after the decoded content is pasted into the selected location with formatting based on the corresponding decoded context information.

With specific regard to the embodiment of FIGS. 7-9, a QR code 750 is rendered on the screen of a mobile device 700 after the mobile device serializes and encodes the data (A, B, C and D) contained within the selected portion 714 of the application interface 720, along with the corresponding data context that defines the formatting, data type, and other application specific data context information for the data. The encoded data and data context in this embodiment includes all of the selected data or only a limited portion of selected data, as described above, with a same or reduced fidelity from what was presented in the application, based on the size of the selected data, the detected constraints of the scannable code and/or specified settings.

The process of serializing and encoding the selected data can be performed automatically in response to detecting the selection of content. Alternatively, the process is triggered in response to further input or conditions, such as detected user input that is entered at an interactive copying tool 740 which is dynamically generated and presented in response to a copy command and/or a detected selection of content at the application interface 720. The interactive copying tool 740 includes one or more displayed interactive objects (e.g., a share icon, a copy icon, a QR icon, one or more other scannable code icon(s), etc.) which, when selected, will trigger the processes described above for generating the QR code or other scannable code corresponding to the selected content.

Once the scannable code 750 is displayed, the destination computing system, such as destination device 800 can scan or otherwise obtain the code 750 with a suitable camera (reflected by dotted circle 810) or another optical sensor. The destination computing system can also obtain the scannable code 750 from an electronic file that is transmitted to the destination computing system, such as in an email or other electronic message.

The destination device 800 can then decode and format the decoded content from the scannable code 750, according to the decoded data context information, and insert the reformatted data into a desired/selected location 814 in an application instance on an interface of the destination device (e.g., application interface 820 that is displayed on the display 810 of mobile device 800).

For instance, FIG. 7 shows data being selected from a first application instance in selection 714 of a source device, which is encoded with formatting context information into QR code 750. This code is scanned and decoded to access the copied data that is inserted into a pasted section 816 within a second instance of the application at the destination device, (after being formatted/positioned/modified) according to the decoded data context information that was encoded within the QR code. The pasted data is shown in FIG. 9, within pasted section 816.

In some instances, the scanning and decoding of the scannable code is triggered in response to a user selection of an interactive object (e.g., a paste icon, a QR icon, etc.) that is displayed on an interactive pasting tool 840. The interactive pasting tool 840 is dynamically displayed, in some instances, in response to a paste command, in response to a user selection of an element or location on an interface, in response to a selection of a menu option, and/or in response to the device 800 detecting a scannable code, etc.

Figure 2:
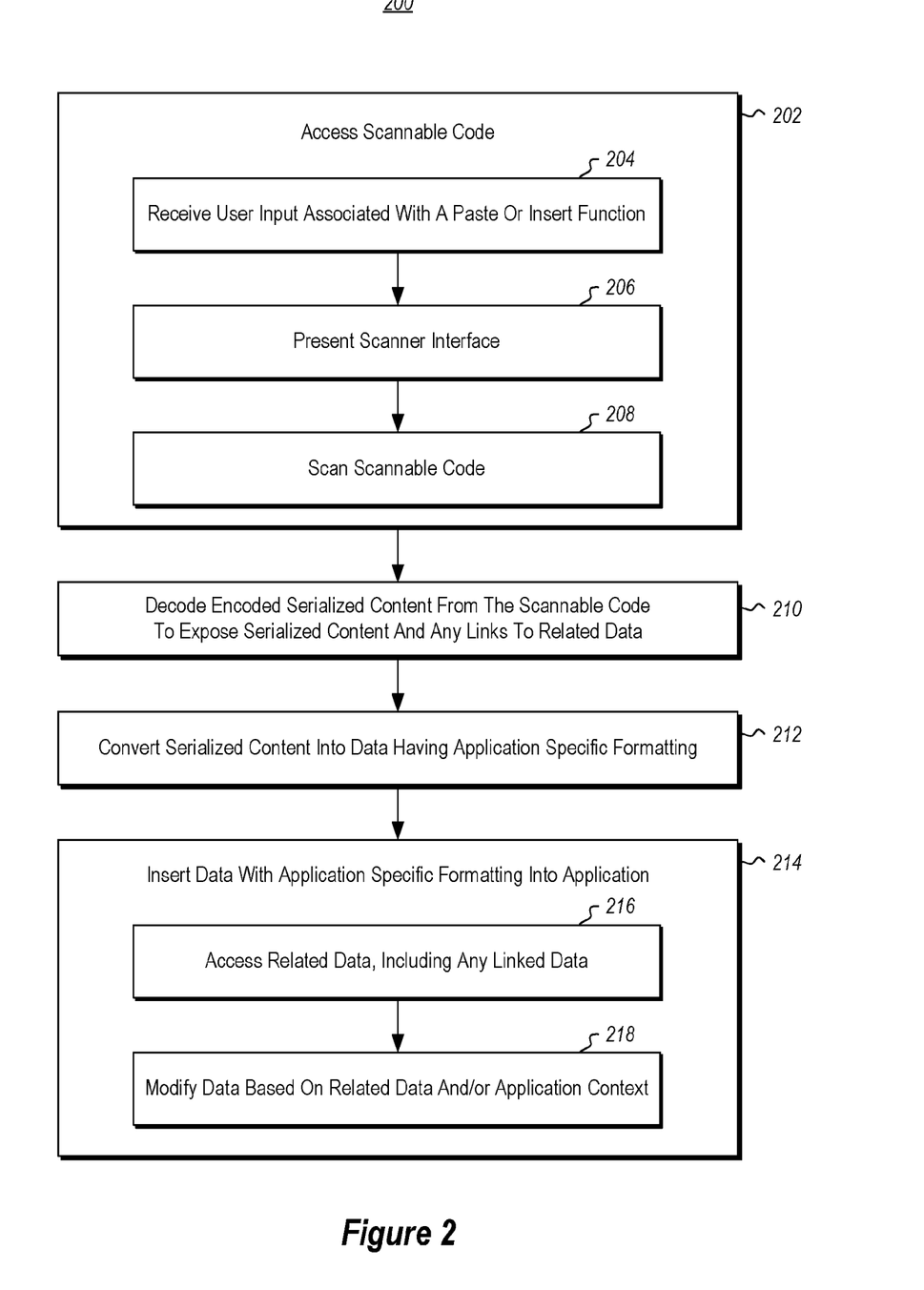
FIG. 2 illustrates a flowchart with various acts that can be implemented by a destination computing system for facilitating copy and paste functionality with scannable codes.

A method for performing the pasting with QR codes is reflected by the flowchart 200 of FIG. 2 and can be performed by any destination computing system (e.g., mobile device 800). The destination computing system includes at least one hardware processor 802 configured to execute computer-executable instructions, a display screen 810 and one or more hardware storage device 812, having stored computer-executable instructions that are executable by the at least one hardware processor to cause the destination computing system to implement at least the acts reflected in the flowchart 200.

As shown in FIG. 2, the illustrated method includes the destination computing system accessing the scannable code (act 202), through a scan of an image and/or from extracting the code from a received electronic message.

The process for accessing the scannable code and a trigger for that process can include receiving user input associated with a paste or insert function (act 204). This user input can comprise an explicit key combination or menu selection corresponding to an insert or paste command.

User input for triggering the process can also include user selection of an object or location on an application interface, like selected location 814, where content is to be pasted and which can dynamically cause the generation/display of an interactive pasting tool 840. Then, an interactive object can be selected at the interactive pasting tool 840 (e.g., the QR icon, a copy icon, a paste icon or other icon) to further trigger the searching for or scanning of the scannable code.

Accessing the scannable code can also include presenting a scanner interface (not shown) on the device (act 206) that is configured to receive user input to initiate a scan and/or to automatically initiate a scan of the code (act 208) with the corresponding cameras and/or optical scanners of the destination device.

Once scanned, the destination device decodes the encoded serialized content of the code (act 210), to thereby expose serialized content (which includes the copied data as well as the data context information) and any links that might exist for data related to the copied data (e.g., data that did not fit into the code and/or formulas and/or other contextually relevant information).

Then the serialized content is de-serialized and/or otherwise converted into data having the specific formatting that is defined by the data context information (act 212). This may include determining a type of application, a version of an application, a type of data, a format for the data, a location for the data in an application instance and/or modifications to be made to the data (before or after being inserted into the application instance) and then making those modifications, as appropriate. The data is then inserted with the specified formatting (act 214). Again, this may include accessing related data and linked data (act 216) as well as modifying the data based on that related/linked data and based on any application context information obtained from the scannable code (act 218), such as by applying formulas and/or incorporating referenced data.

FIG. 9 shows content pasted into interface 820, which includes data elements A, B, C and D in sequential cells of a column for a spreadsheet application instance. This data and formatting corresponds directly to the data and formatting of the copied data that was selected from a spreadsheet application instance at the source device (e.g., selected content 714 of FIG. 7). It is noted that the specific formatting for this pasted data content was defined by the data context information that was embedded within the scannable code 750 along with the encoded data content itself. It is also noted that this formatting information is distinguished from standard formatting information for QR codes (found next to the corner boxes) that is used to specify how the encoded content is positioned or formatted within the code.

In some embodiments, the device is unable to convert the serialized content into data having application specific formatting and/or to insert the data into an application instance because the device does not have: a proper application installed, a proper version of the application installed, a proper license for the application, a proper credential for using the application, etc. In these instances, the device can prompt the user to install, access and/or authorize use of the necessary application. This can help incentivize sales of products that correspond to the encoded data. Alternatively, the destination device obtains/installs the necessary application automatically. The application can be prompted for and/or obtained by the destination device using application type and/or versioning information explicitly included in the context information that is decoded from the scannable code.

In some instances, the device decodes and utilizes certificates, tokens, security keys, decryption keys or other use information from the scannable code, which may be encoded with the other encoded content and context information, which is operable to further facilitate accessing, processing and/or using any of the encoded data, once it is decoded from the scannable code.

Figure 3:
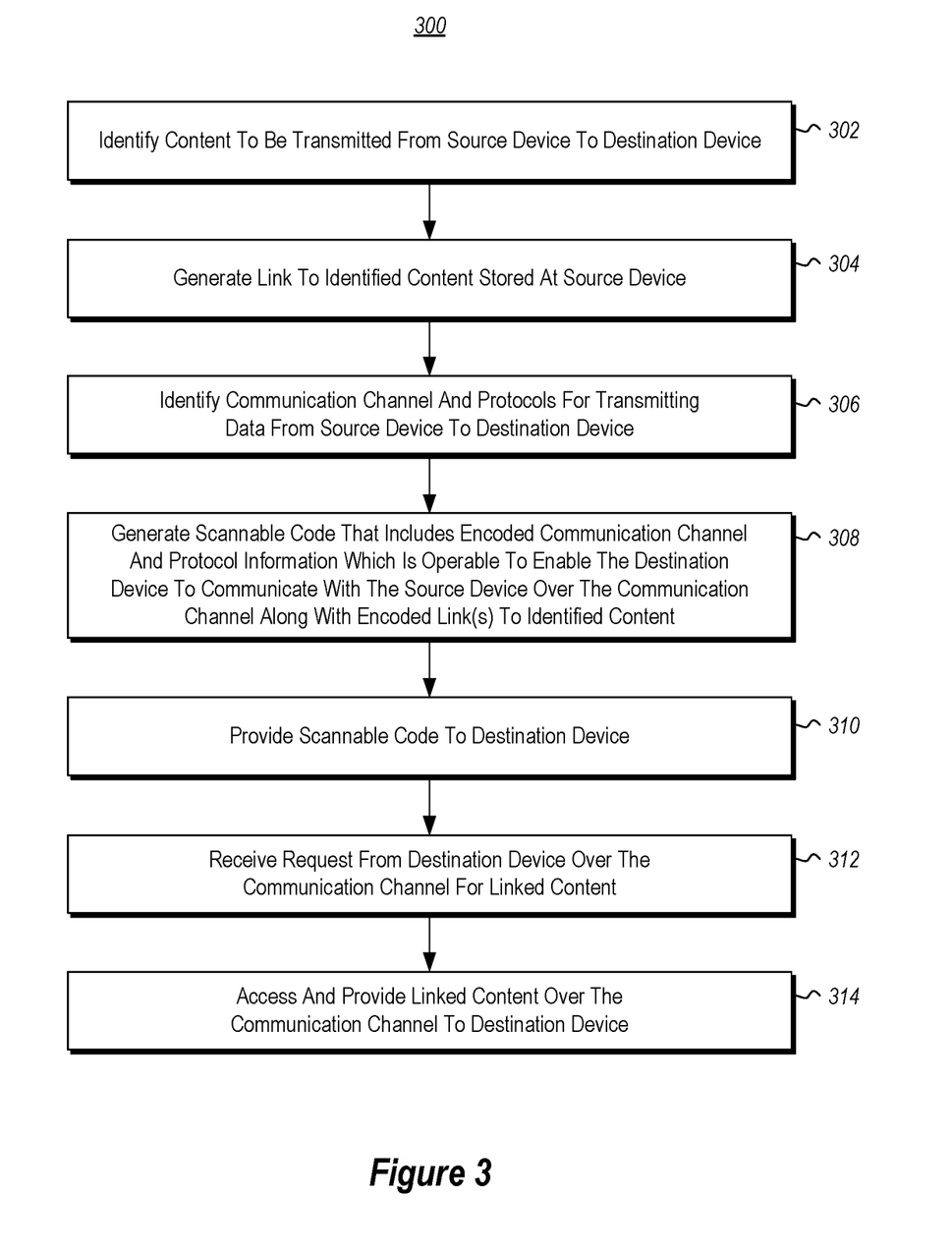
FIG. 3 illustrates a flowchart with various acts that can be implemented by a source computing system for facilitating peer to peer transmission of content utilizing scannable codes, without utilizing intermediary computing device(s)

Attention is now directed to FIG. 3, which illustrates a flowchart 300 of a method that can be implemented by a source computing system for facilitating peer to peer transmission of content utilizing scannable codes, without utilizing intermediary computing device(s).

As shown, the method includes the source device identifying content to be transmitted from the source device to a destination device (act 302). Then, (optionally) in some instances, a link is generated for the content that is stored at the device (act 304). Next, the source device identifies a communication channel and protocol for direct communication between the source device and the destination device (act 306). This can include any pairing information that may be obtained during a pairing process.

A scannable code, such as a QR code, is then generated by encoding the communication and protocol information that is necessary for communicating with the source device (act 308). If links to content were generated, they can be encoded into the scannable code too. Sometimes, content itself is encoded into the code along with formatting information, as described above.

The scannable code is then provided to the destination device (act 310), either through a display of the code (e.g., on a display screen of the source device) or by transmission (e.g., Bluetooth or other peer to peer transmission).

Then, the destination device extracts the content directly from the code, as described above, and/or sends a request for some or all of the content based on one or more links in the code. For instance, this can be performed by the destination device decoding the scannable code and de-serializing the decoded information (when necessary) to reveal the communication channel, the protocol information, data, and one or more link(s) transmitted within the scannable code. Then, the destination device sends an explicit request for the linked content over the communication channel and using the protocol(s) specified in the encoded information. The source device, upon receiving this request (act 312), accesses and provides the linked content to the destination/requesting device (act 314) over the specified communication channel or another communication channel.

In some embodiments, the request for the linked content and the subsequent reply with the linked content are transmitted over direct peer to peer communication channels, without any intermediary device or network connection (e.g., without use of the Internet, the cloud, a proxy server, router, etc.) Instead, the source device operates directly as a server to the destination device that operates as a client to the source 'server' and with a peer to peer pairing of the devices.

This process is also illustrated in FIG. 4, which includes a flowchart of corresponding acts recited from the perspective of the destination device. In particular, the illustrated process/method includes the destination device obtaining a scannable code from a data source (act 402), such as by scanning an image of a QR code or another code. This act can be represented by the imagery of FIG. 8, for example.

The destination device decodes the scannable code to identify links to data and communication channel and protocol information (act 404). This may include de-serializing and formatting any encoded content from the scannable code. Then, a request is generated for linked content based on the decoded/de-serialized link(s) (act 406). The link(s) can take any form and can include any information to identify the storage location(s) and/or version(s) of information on the source device. In some instances, the encoded link includes one or more of a file name, a timestamp, a version, a file type, a folder, a directory, a container, an application and/or other information.

The request, which may explicitly include one or more link is transmitted over the communication channel and with the specified protocol (if one was specified/included with the scannable code) to the source device (act 408). Then, the destination device receives the requested data over the same communication channel or a different communication channel (act 410). In some instances, the data is received through another scannable code that is generated at the source device in response to receiving the request and which encodes the requested data into a new scannable code.

FIG. 5 illustrates yet another process for utilizing scannable codes. In this embodiment, a scannable code is used to encrypt, redact, visually compress and/or replace content with a scannable code. The illustrated flowchart 500 includes an act of identifying selected data to be encoded (act 502). This is any data that is specifically selected, highlighted or otherwise identified for encoding. For instance, a user can highlight a segment of text or other data displayed on a user interface and then provide a command to encode that selected segment of content. However, rather than generating a separate interface for rendering the scannable code of the selected/encoded content, the scannable code is rendered in the same general placement where the selected data was previously presented, thereby compressing, redacting, obfuscating or otherwise replacing the content with a scannable code.

In some embodiments, the content is also encrypted prior to encoding (act 506). This encryption can be performed with a public/private key associated with one or more corresponding public/private keys which combination is securely shared between trusted devices.

A scannable code, such as a QR code or other scannable code is then encoded with the selected content (which may be encrypted) (act 508). Corresponding expiration parameters, decryption information, certificate information, tokens, and/or access privileges associated with the content can also be encoded into the scannable code, which specify policies/procedures for accessing, decrypting and/or using the encoded information.

This scannable code is then displayed in place of the selected/encoded content (act 510). In some instances, this reduces the size profile of the selected content, as the displayed code may take up less room than the corresponding content. In some instances, the scannable code is resized and/or modified according to display parameters of a corresponding document in which the scannable code is presented (e.g., by changing a size, color, shading, etc. of the code).

The type of code (e.g., QR, barcode, etc.) that is used to encode the content can also be selected to accommodate different needs and preferences and settings associated with different applications and/or content types.

When the scannable code is later scanned, by an application displaying the code (in response to a user request to display the encoded data), and or in response to a separate device scanning the code, the destination device/application can refrain from decoding/displaying the underlying content that is included within the scannable code when authorizations, expirations and/or other policies are not met (as defined by the encoded policies and information included in the scannable code with the content and/or links to the content).

The scanning/destination system detects the encryption information, credential requirement information, and other security information that is encoded within the scannable code during the decoding process. Then, the destination system prompts the user for the requisite authorization information and/or automatically obtains it from the system (when present). This authorization information is used to decrypt and/or access and display the rest of the decoded information, when corresponding expiration parameters included with the code (if any) have not expired.

In some instances, a third party receives a first set of decoded information from the destination device (which the destination device decodes from the scannable code) and provides the destination device additional information (keys/authorizations) that the destination device uses to decrypt/decode a second set of decoded information from the scannable code. Sometimes the first set of decoded information includes expiration and/or authorization requirements and the third party only provides the additional information to the destination device when the expiration and/or authorization requirements satisfy predetermined policies (e.g., an expiration period has not tolled, the destination device has a subscription or authorization level that warrants access to the second set of decoded information).

FIG. 6A illustrates an example of a document 600A with content that includes selected portions of sensitive information 610A embedded within a first paragraph and an entirely sensitive third paragraph 620A.

In this example, a user selects and/or an application automatically identifies this sensitive information (610A, 620A), based on preferences and/or predetermined criteria (e.g., by identifying terms, tuples and/or content that is identified by the user and/or that is indexed in a sensitivity index). In some instances, this process is triggered automatically or, alternatively, in response to a subsequent user request (e.g., selection of an interactive interface object) after the sensitive information is entered into a specified input field, for example.

The system then converts the selected sensitive information (610A, 620A) into corresponding scannable codes (610B and 620B, respectively), as shown. In some instances, the scannable codes (610B, 620B) are created for links to a selected set or a full set of the sensitive information, in which case the selected/full set of sensitive information is moved to and stored in a separate file that is used to store the rest of the document (600A, 600B).

The encoded sensitive information and/or links are then (optionally) encrypted and encoded with corresponding access information that is also encoded. This access information, as described above, can include any access or use information, including expiration policy information, authorization information, decryption information and/or other policy information.

When the scannable code is decoded and appropriate authorizations and/or decryptions are used to access the encoded content, at a later time (e.g., when the document is loaded by a same or different device), the sensitive information is presented back into the document, replacing the scannable code. Alternatively, a secondary device scans and displays the sensitive information independently/without the remaining content of the document.

Embodiments of this disclosure, as reflected above, may be practiced by computer systems and computer devices that include one or more hardware processors and computer readable media such as computer memory. In particular, the computer memory may store computer executable instructions that when executed by one or more processors cause various functions to be performed, such as the acts recited in the embodiments.

Although some specific implementations have been described herein, with regard to the source computing system and the destination computing system, it will be appreciated that these systems can also include additional components that were not specifically identified, to further facilitate the disclosed embodiments. For instance, the source computing system further includes a hardware transmitter configured to transmit communications including the encoded serialized content and other requested content over the one or more network channels described herein. Similarly, the destination computing system further includes a hardware receiver and transmitter configured to receive and transmit communications, respectively, including the scannable code, links and corresponding content that is requested and/or linked to.

Disclosed computing systems and devices also comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims. The scope of this disclosure includes any combination and ordering of the recited acts.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, phablets, tablets, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A data source computing system configured for facilitating a copy function with a scannable code that includes encoded data as well as corresponding encoded context information, wherein the scannable code is provided to destination computing system, the data source computing system comprising:
    at least one hardware processor configured to execute computer-executable instructions;
    a display screen;
    one or more hardware storage device having stored computer-executable instructions that are executable by the at least one hardware processor to cause the data source computing system to implement the following:
        identify selected data, the selected data being selected from an application;
        identify data context information for the selected data;
        identify one or more portions of the selected data to serialize;
        serialize the one or more portions of the selected data as well as the data context information into serialized content;
        encode the serialized content into encoded serialized content, comprising a scannable code; and
        render the scannable code or otherwise transmit the scannable code to the destination computing system.

2. The data source computing system of claim 1, wherein the stored computer-executable instructions are further executable by the at least one hardware processor to cause the data source computing system to identify the one or more portions of the selected data to serialize by determining whether the one or more portions can be serialized and encoded into predetermined size constraints.

3. The data source computing system of claim 1, wherein the stored computer-executable instructions are further executable by the at least one hardware processor to cause the data source computing system to refrain from serializing and encoding all of the selected data.

4. The data source computing system of claim 3, wherein the stored computer-executable instructions are further executable by the at least one hardware processor to cause the data source computing system to serialize and encode a link to any of the selected data that is not identified in the one or more portions of the selected data to serialize.

5. The data source computing system of claim 1, wherein the stored computer-executable instructions are further executable by the at least one hardware processor to cause the data source computing system to reduce a fidelity of the one or more portions of the selected data prior to encoding the serialized content based on at least one of a storage constraint or a user defined preference.

6. The data source computing system of claim 1, wherein the stored computer-executable instructions are further executable by the at least one hardware processor to cause the data source computing system to encrypt the identified portions of selected data prior to encoding the serialized content.

7. The data source computing system of claim 1, wherein the stored computer-executable instructions are executable by the at least one hardware processor to cause the data source computing system to render the scannable code as an image on a display screen of the data source computing system.

8. The data source computing system of claim 1, wherein the stored computer-executable instructions are executable by the at least one hardware processor to cause the data source computing system to identify the portions of selected data and data context information to serialize and encode in response to receiving a user input comprising a request to copy or to generate a scannable code.

9. The data source computing system of claim 1, wherein the scannable code is a QR code.

10. The data source computing system of claim 1, wherein the data context information includes an application type or a data type corresponding to the selected data.

11. The data source computing system of claim 1, wherein the data context information includes positioning information corresponding to a relative positioning of the selected data in an application interface.

12. The data source computing system of claim 1, wherein the data context information includes display attributes and including one or more of transparency, font type, shading, coloring, highlighting or other display attribute.

13. The data source computing system of claim 1, wherein the data context information includes metadata attribute information corresponding to the selected data, the metadata attribute information including at least one of author information, formula information, or versioning information.

14. The data source computing system of claim 1, wherein the stored computer-executable instructions are further executable by the at least one hardware processor to cause the data source computing system to transmit the scannable code to the destination computing system over one or more network channels and wherein the data source computing system further includes a hardware transmitter configured to transmit communications including the encoded serialized content over the one or more network channels.

15. The destination computing system of claim 1, wherein the stored computer-executable instructions are further executable by the at least one hardware processor to cause the destination computing system to access the scannable code by using an optical sensor to capture an image of scannable code.

16. The destination computing system of claim 1, wherein the stored computer-executable instructions are further executable by the at least one hardware processor to cause the destination computing system to access the scannable code by requesting and receiving a transmission of the scannable code over a network communication channel, wherein the destination computing system further includes a hardware receiver and transmitter configured to receive and transmit communications, respectively, including the scannable code over the one or more network channels.

17. The destination computing system of claim 1, wherein the stored computer-executable instructions are further executable by the at least one hardware processor to cause the destination computing system to access the scannable code in response to receiving a user request for a paste function to be performed, the user request being received within an application interface of the application where the data is inserted.

18. The destination computing system of claim 1, wherein the serialized content includes a link to other content that is stored remotely from the destination computing system, wherein the stored computer-executable instructions are further executable by the at least one hardware processor to cause the destination computing system to access the other content through the link by utilizing a hardware receiver and transmitter.

19. A destination computing system configured for facilitating a paste function with a scannable code that includes encoded content and encoded context information, the destination computing system comprising:
at least one hardware processor configured to execute computer-executable instructions;
a display screen;
one or more hardware storage device having stored computer-executable instructions that are executable by the at least one hardware processor to cause the destination computing system to implement the following:
access a scannable code;
decode encoded serialized content identified within the scannable code to expose serialized content that includes one or more portions of data and corresponding context information associated with the one or more portions of data;
convert the serialized content into data having application specific formatting based on the context information; and
insert the data into an application with the specific formatting.

20. The destination computing system of claim 19, wherein the stored computer-executable instructions are further executable by the at least one hardware processor to cause the destination computing system to modify the data prior to or subsequent to inserting the data based on other content related to the data or the corresponding context of the application.

* * * * *

UNITED STATES PATENT AND TRADEMARK OFFICE
CERTIFICATE OF CORRECTION

PATENT NO.        : 9,710,742 B2
APPLICATION NO.   : 14/957555
DATED             : July 18, 2017
INVENTOR(S)       : Wujun Li et al.

Page 1 of 1

It is certified that error appears in the above-identified patent and that said Letters Patent is hereby corrected as shown below:

In the Claims

Column 15
Line 1, change "destination system of claim 1" to --destination system of claim 19--
Line 7, change "destination system of claim 1" to --destination system of claim 19--
Line 17, change "destination system of claim 1" to --destination system of claim 19--
Line 25, change "destination system of claim 1" to --destination system of claim 19--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*